United States Patent [19]
Adams, Jr. et al.

[11] B 3,925,380
[45] Dec. 9, 1975

[54] QUINOXALINYLTHIOALLOPHANATE FUNGICIDES

[75] Inventors: John Benjamin Adams, Jr., Hockessin; Gregory Wayne Schwing, Wilmington, both of Del.

[73] Assignee: E. I. Du Pont de Nemours & Company, Wilmington, Del.

[22] Filed: Aug. 13, 1973

[21] Appl. No.: 387,790

[44] Published under the Trial Voluntary Protest Program on January 28, 1975 as document no. B 387,790.

[52] U.S. Cl. ............... 260/250 Q; 424/250
[51] Int. Cl.² ............... C07D 241/40
[58] Field of Search .......... 260/250 Q, 256.4 Q

[56] References Cited
UNITED STATES PATENTS

| | | | |
|---|---|---|---|
| 3,457,272 | 7/1969 | Crook et al. | 260/256.4 Q |
| 3,655,893 | 4/1972 | Gier et al. | 260/250 Q |
| 3,733,323 | 5/1973 | Douglass | 260/250 Q |
| 3,761,475 | 9/1973 | Kurihara | 260/250 Q |

FOREIGN PATENTS OR APPLICATIONS

| | | |
|---|---|---|
| 1,930,450 | 11/1970 | Germany |
| 2,002,759 | 9/1970 | Germany |
| 1,806,123 | 6/1969 | Germany |

*Primary Examiner*—Alton D. Rollins
*Assistant Examiner*—D. Wheeler

[57] ABSTRACT

Quinoxalinylthioallophanates such as methyl 4-(3-amino-2-quinoxalinyl)-3-thioallophanate are useful as fungicides.

3 Claims, No Drawings

QUINOXALINYLTHIOALLOPHANATE FUNGICIDES

BACKGROUND OF THE INVENTION

This invention relates to a novel class of quinoxalinylthioallophanates and their use as fungicides and fungistats. Several patents disclose thioallophanates as fungicides:

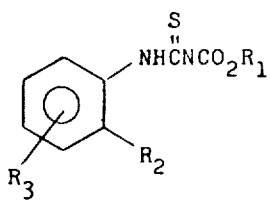

Ger. Offen., 1,930,450;

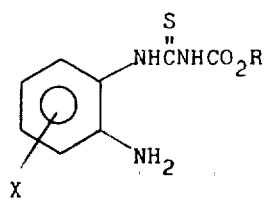

Ger. Offen., 2,002,759; and

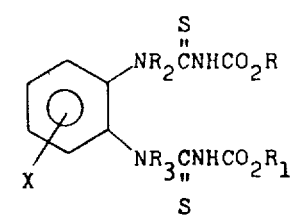

Ger. Offen., 1,806,123.

Compounds of these patents are structurally different from the compounds of the present invention in that the patented compounds are derivatives of o-nitro- or (o-amino-) anilines whereas compounds of the present invention are derivatives of 2,3-diaminoquinoxalines. Additionally, these patents do not disclose or suggest use of thioallophanates for control of Rhizopus.

SUMMARY OF THE INVENTION

The novel fungistatic or fungicidal compounds described below prevent the destruction of plant material by fungi when they are applied in effective amounts to the material to be protected. These compounds also have curative activity.

The term "plant material" as used herein is meant to include the post-harvest plants and plant parts and items made from such plant parts that Rhizopus fungi attack. Thus, the term includes fruits, vegetables, roots, seeds, stems, leaves and such manufactured items as bread. When applied to previously infected fruits and vegetables, the compounds described below stop further development of the fungal pathogen and effectively cure the disease. The fungistatic or fungicidal compounds are quinoxalines represented by the formula:

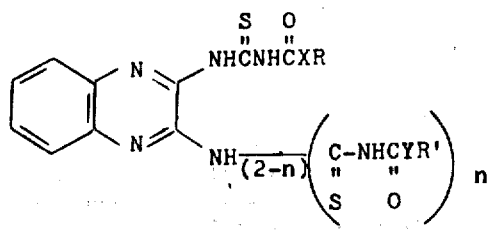

where
X is oxygen or sulfur;
Y is oxygen or sulfur;
R and R' are the same or different and are selected from a group consisting of alkyl of 1 to 4 carbon atoms, allyl and methoxyethyl; and
$n$ is 0 or 1.

Preferred are those compounds of formula I where $n$ is 0.

A preferred compound is methyl 4-(3-amino-2-quinoxalinyl)-3-thioallophanate

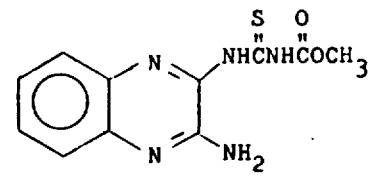

DESCRIPTION OF THE PREFERRED EMBODIMENTS

For the sake of clarity, the nomenclature used throughout this case is based on the position numbering system for quinoxalines shown below:

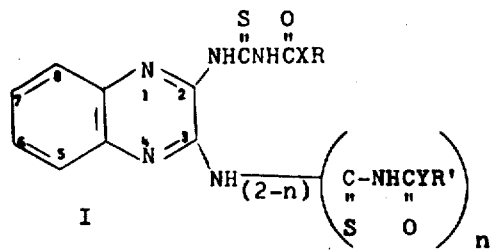

However, it should be noted that the compound may exist as such or in other isomeric forms (compounds II, III and IV) or tautomeric forms thereof, and that the isomers, tautomers, and mixtures of these isomers and tautomers are intended to be included, even though the compounds will be named as compounds of type I.

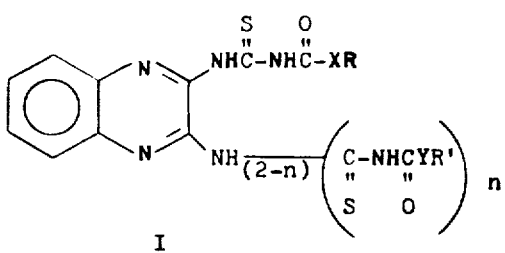
I
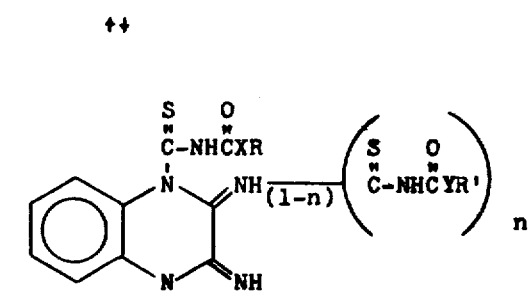
IIb
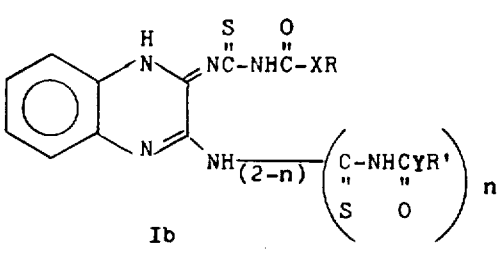
Ib
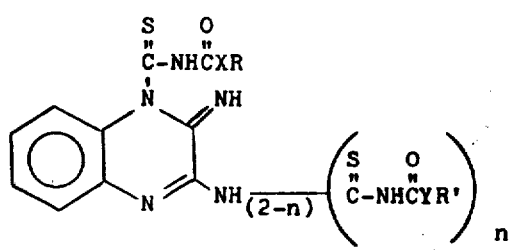
III
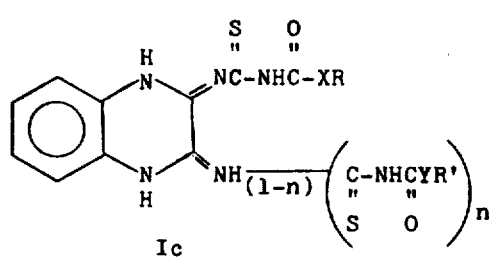
Ic
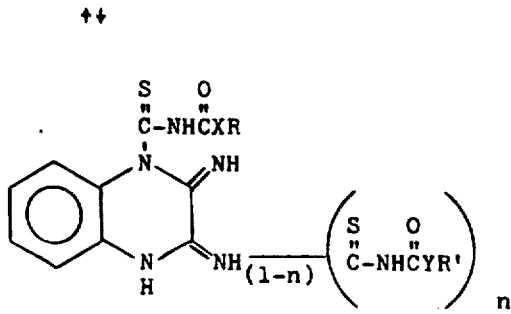
IIIb
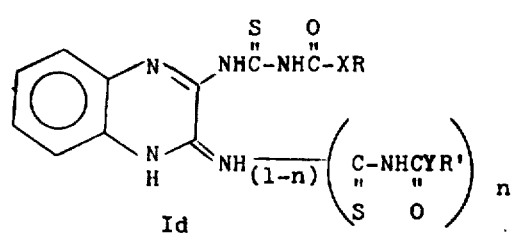
Id
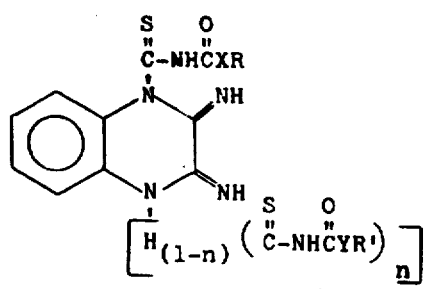
IV
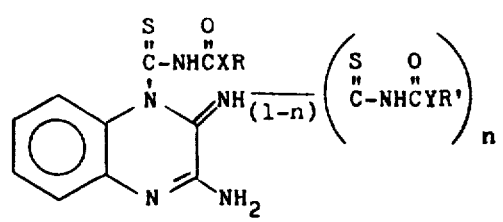
II
The compounds of this invention are made by the process illustrated by the following equation, wherein the substituents are as previously defined:

1. 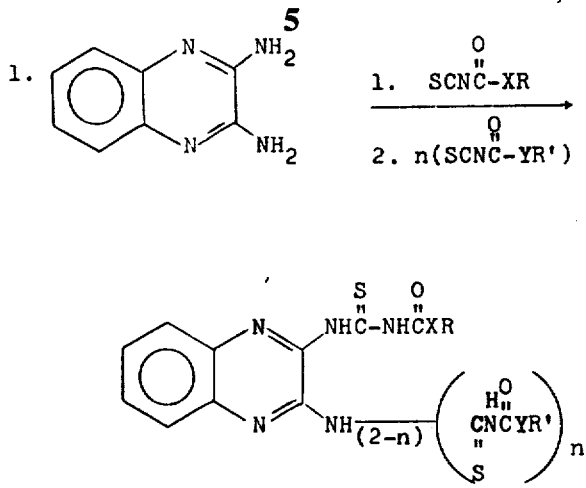

The starting material for reaction 1, a 2,3-diaminoquinoxaline, is prepared as follows:

2. 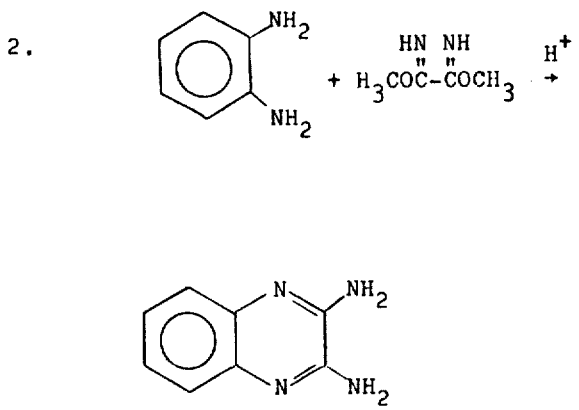

The o-phenylenediamine in the above reaction 2 is commercially available or easily synthesized by those skilled in the art. The dimethyl oxaldiimidate reactant can be prepared by the reaction of cyanogen in an excess of methanol, preferably with a basic catalyst. Temperatures and pressures in this reaction are not critical but temperatures and pressures should be selected to handle gaseous cyanogen conveniently, as is known to those skilled in the art. Dimethyl oxaldiimidate can be isolated from the reaction mixture by distillation. The compound boils at 65° C. at 43 mm pressure. The dimethyl oxaldiimidate can also be formed and reacted with the o-phenylenediamine in situ. Reaction 2 above proceeds in a methanol solvent system at room temperature. A small amount of acid is required. The preparation of 2,3-diaminoquinoxalines is also described in Hinsberg and Schwantes, Ber. 36, 4039 (1903) and Schipper and Day, J. Amer. Chem. Soc. 73, 5672 (1951).

The isothiocyanate is prepared by reaction of an ammonium or alkali metal salt of thiocyanic acid with an appropriate chloroformate in an inert solvent such as acetone or acetonitrile at temperatures from 0° to 40° C. This general procedure is taught by Takamizawa, Hirai, and Matsui, Bull. Chem. Soc. Japan, 36, 1214 (1963). The acyl isothiocyanate thus obtained can be conveniently reacted without further purification with 2,3-diaminoquinoxaline. This reaction is preferably carried out in an inert solvent such as tetrahydrofuran, acetone, or dioxane. The temperature of the reaction can be varied from about −10° to 150° C., and the reaction time can be varied from about 1 hour to a week, longer reaction times corresponding to lower temperatures, preferably 12 to 48 hours at 25° to 40° C. The order of addition of the reactants is not critical, and the mole ratio of the acyl isothiocyanate to diaminoquinoxaline can be varied from about 1:1 to 4:1, an excess of the acyl isothiocyanate favoring the introduction of a second thioallophanyl substituent.

The following Examples further illustrate the preparation of the compounds of this invention. In the Examples, all percentages and parts are by weight and temperatures in degrees centigrade, unless otherwise indicated.

EXAMPLE 1

Methyl 4-(3-Amino-2-quinoxalinyl)-3-thioallophanate

To 97 parts of potassium thiocyanate and 500 parts of acetone, 94 parts of methyl chloroformate was added dropwise at 25°. The reaction mixture was stirred for 1 ½ hours and potassium chloride removed by filtration. The carbomethoxy isothiocyanate (filtrate) was added dropwise to a slurry of 160 parts of 2,3-diaminoquinoxaline in 1000 parts of tetrahydrofuran at 25°, and the reaction mixture was stirred for 48 hours. Insoluble material was filtered off and washed with hot methanol. The filtrate and wash were concentrated to a solid, which was dissolved in hot butanol and insoluble material was removed by filtration. Two recrystallizations (butanol) of the solid gave 40 parts of methyl 4-(3-amino-2-quinoxalinyl)-3-thioallophanate, m.p. 205°–210°.

By the general procedure of Example 1, through use of the appropriate starting materials, the following compounds can be prepared:

butyl 4-(3-amino-2-quinoxalinyl)-3-thioallophanate m.p. 310°
ethyl 4-(3-amino-2-quinoxalinyl)-3-thioallophanate
allyl 4-(3-amino-2-quinoxalinyl)-3-thioallophanate
2-methoxyethyl 4-(3-amino-2-quinoxalinyl)-3-thioallophanate m.p. 308°
S-methyl 4-(3-amino-2-quinoxalinyl)-1,3-dithioallophanate m.p. 195°–205°

EXAMPLE 2

Methyl 4-[3-(3-Methoxycarbonyl-2-thioureido)-2-quinoxalinyl]-3-thioallophanate

To 97 parts of potassium thiocyanate and 500 parts of acetone was added 94 parts of methyl chloroformate dropwise at 25°. The reaction mixture was stirred for 1½ hours, and potassium chloride was removed by filtration. The carbomethoxy isothiocyanate (filtrate) was added dropwise to a slurry of 80 parts of 2,3-diaminoquinoxaline in 1000 parts of tetrahydrofuran at 25°, and the reaction mixture stirred for 48 hours. Insoluble material (30 parts) was filtered off and washed with hot methanol. The filtrate and wash were concentrated and recrystallized three times from dimethylformamide to give 20 parts of methyl 4-[3-(3-methoxycarbonyl-2-thioureido)-2-quinoxalinyl]-3-thioallophanate, m.p. 295°–300°. Addition of water to the dimethylformamide gave an additional 30 parts of a mixture of methyl 4-[3-(3-methoxycarbonyl-2-thioureido)-2-quinoxalinyl]-3-thioallophanate and methyl 4-(3-amino-2-quinoxalinyl)-3-thioallophanate.

By the general procedure of Example 2, through use of the appropriate starting materials, the following compounds can be prepared:

ethyl 4-[3-(3-ethoxycarbonyl-2-thioureido)-2-quinoxalinyl]-3-thioallophanate, m.p. 295°
butyl 4-[3-(3-butoxycarbonyl-2-thioureido)-2-quinoxalinyl]-3-thioallophanate
allyl 4-[3-(3-allyloxycarbonyl-2-thioureido)-2-quinoxalinyl]-3-thioallophanate
2-methoxyethyl 4- 3-[3-(2-methoxyethoxycarbonyl)-2-thioureido]-2-quinoxalinyl -3-thioallophanate
S-methyl 4- 3-[3-(S-methylthiocarbonyl)-2-thioureido]-2-quinoxalinyl -1,3-dithioallophanate By treatment of a compound obtained by the general procedure of Example 1 with a second portion of a different isothiocyanate, the following compounds of the mixed type can be prepared:

methyl 4-[3-(3-ethoxycarbonyl-2-thioureido)-2-quinoxalinyl]-3-thioallophanate
S-methyl 4-[3-(3-methoxycarbonyl-2-thioureido)-2-quinoxalinyl]-1,3-dithioallophanate The compounds of this invention posses outstanding activity when employed to prevent or mitigate damage to plant material or inanimate objects by fungi. The compounds are particularly effective for controlling the fruit and vegetable rotting and bread mold Rhizopus fungi. Plant material is protected by preventive (before infection) and curative (after infection) treatments.

The compounds of this invention control a wide variety of Rhizopus diseases of fruits, vegetables, seeds and other plant material without damage to the host.

The compounds of this invention provide protection from damage caused by Rhizopus fungi when applied to the proper locus by the methods described hereinafter and at a sufficient rate to exert the desired fungicidal or fungi-static effect. They are especially suited for the protection of fruits, vegetables and seeds.

Fruits and vegetables are protected from fungi by dip treatment with one or more of the compounds of this invention as a solution or suspension. Plant seed or other reproductive parts are protected by applying the chemical or chemicals as a dust or slurry treatment. Foods and feeds are protected by adding the chemical or chemicals prior to mixing or blending.

Dip treatments are prepared from wettable powders. Rates for application of the compounds of this invention to water or other materials in which fruits and vegetables are dipped range from 10 to 1,000 parts per million by volume of the liquid in which the plant materials are dipped.

Rates for application to seeds or other reproductive plant parts range from 10 to 1,000 grams of active compound of this invention per 100 kilograms of planting material treated. Applications are made from dusts, slurries or solutions.

Rates for application of the compounds of this invention to foods and feeds range from 10 to 1,000 parts per million by weight of the material being treated.

The compositions of the invention can contain, in addition to the active ingredient of this invention, conventional insecticides, miticides, bactericides, fungicides, degreening agents, or other agricultural chemicals such as antisprouting agents so the compositions can serve useful purposes in addition to the control of fungi.

In particular, the compounds of this invention can be combined with other fungicides with complementary spectra of activity. For example, the compounds of this invention which control Rhizopus can be combined with benomyl or methyl 2-benzimidazolecarbamate fungicide not effective against Rhizopus but very effective against Botrytis. The resulting composition will be effective against both types of fungi. The proper choice of amounts is readily made by one skilled in the art of protecting plant materials from pest depredations.

The outstanding control of *Rhizopus stolonifer* in foods and feeds is illustrated by a laboratory test. Cornmeal previously inoculated with *Rhizopus stolonifer* sporangia is dispensed in a thin layer and uniformly sprayed with enough methyl 4-(3-amino-2-quinoxalinyl)-3-thioallophanate in aqueous suspension to deposit 100 µg compound per gram of meal. Untreated controls are sprayed with a like volume of water. The open containers are placed in plastic bags to prevent desiccation and are incubated for 7 days at 25° C. At the end of incubation, the untreated meal is completely overgrown with heavily sporulating *Rhizopus stolonifer* mycelia. The meal treated with the compound of this invention shows no sign of fungal growth and thus represents 100% control.

The curative activity of the compounds of this invention is demonstrated by a test on fresh strawberries from California. The fruit are inoculated by atomizing lightly with an aqueous suspension of *Rhizopus stolonifer* sporangia. They are then incubated 8 hours in a chamber at 29° C. and 98% R.H. before being treated. Treatment consists of a 2 minute dip in an agitated aqueous suspension of methyl 4-(3-amino-2-quinoxalinyl)-3-thioallophanate at a concentration of 1,000 ppm. Untreated control fruit are dipped in water. All fruit are then returned to the incubator.

At the end of 4 days' incubation, the untreated controls are completely overgrown with heavily sporulating *Rhizopus stolonifer* mycelia and have extensive juice leakage. The fruit treated with the compound of this example remain firm and fresh in appearance and odor and show no sign of fungal growth. They have thus been cured of the infections that resulted during the 8 hours' incubation before treatment.

The excellent preventive control of Rhizopus decay of fruits and vegetables is illustrated by a laboratory test on strawberries. Fresh strawberries are dip-treated for 2 minutes in an agitated aqueous suspension of 1,000 ppm methyl 4-(3-amino-2-quinoxalinyl)-3-thioallophanate. The dip treatment also contained Benlate benomyl fungicide at a concentration of 500 ppm benomyl. Additional dip treatments are made with 1000 ppm methyl 4-(3-amino-2-quinoxalinyl)-3-thioallophanate alone, 500 ppm benomyl alone and water alone. After drying, the fruit are inoculated by atomizing lightly with an aqueous spore suspension of Rhizopus, then *Botrytis cinerea*. The fruit are then incubated for 3 days in a chamber at 29° C. and 95–98% R.H. After incubation, the fruit dipped in water alone have become soft, are leaking juice and are covered by mycelial growth of both Rhizopus and Botrytis.

The fruit treated with Benlate benomyl fungicide alone show no Botrytis growth but are covered with Rhizopus mycelia. Fruit treated with methyl 4-(3-amino-2-quinoxalinyl)-3-thioallophanate alone show no Rhizopus growth and have only 40% as much Botrytis as the untreated controls. The combination of methyl 4-(3-amino-2-quinoxalinyl)-3-thioallophanate with Benlate benomyl fungicide has provided 100% control of both Rhizopus and Botrytis fungi and the fruit retain their fresh, healthy appearance and odor.

Useful formulations of the compounds of this invention can be prepared in conventional ways. They include dusts, solutions, suspensions, emulsions, wettable powders, emulsifiable concentrates and the like. Many of these may be applied directly as wettable powders and other sprayable formulations can be extended in suitable media and used as a spray or as a dip treatment for plant material. High-strength compositions are primarily used as intermediates for further formulation. The formulations, broadly, contain about 1% to 99% by weight of active ingredient(s) and at least one of (a) about 0.1% to 20% surfactant(s) and (b) about 5% to 99% solid or liquid diluent(s). More specifically, they will contain these ingredients in the following approximate proportions:

|  | Percent by Weight | | |
| --- | --- | --- | --- |
|  | Active Ingredient | Diluent(s) | Surfactant(s) |
| Wettable Powders | 20–90 | 0–74 | 1–10 |
| Oil Suspensions, Emulsions, Solutions (including Emulsifiable Concentrates) | 5–50 | 40–95 | 0–15 |
| Aqueous Suspensions | 10–50 | 40–84 | 1–20 |
| Dusts | 1–25 | 70–99 | 0–5 |
| High-Strength Compositions | 90–99 | 0–10 | 0–2 |

Lower or higher levels of active ingredient can, of course, be present depending on the intended use and the physical properties of the compound. Higher ratios of surfactant to active ingredient are sometimes desirable, and are achieved by incorporation into the formulation or by tank mixing.

Typical solid diluents are described in Watkins, et al., "Handbook of Insecticide Dust Diluents and Carriers", 2nd Edn., Dorland Books, Caldwell, N.J. The more absorptive diluents are preferred for wettable powders and the denser ones for dusts. Typical liquid diluents and solvents are described in Marsden, "Solvents Guide", 2nd Edn., Interscience, New York, 1950. Solubility under 0.1% is preferred for suspension concentrates; solution concentrates are preferably stable against phase separation at 0° C. "McCutcheon's Detergents and Emulsifiers Annual", Allured Publ. Corp., Ridgewood, New Jersey, as well as Sisely and Wood, "Encyclopedia of Surface Active Agents", Chemical Publ. Co., Inc., New York, 1964, list surfactants and recommended uses. All formulations can contain minor amounts of additives to reduce foam, caking, corrosion, microbiological growth, etc. Preferably, ingredients should be approved by the U.S. Environmental Protection Agency for the use intended.

The methods of making such compositions are well known. Solutions are prepared by simply mixing the ingredients. Fine solid compositions are made by blending and, usually, grinding as in a hammer or fluid energy mill. Suspensions are prepared by wet milling (see, for example, Littler, U.S. Pat. No. 3,060,084).

For further information regarding the art of formulation, see for example:
J. B. Buchanan, U.S. Pat. No. 3,576,834, Apr. 27, 1971, Col. 5, Line 36 through Col. 7, Line 70, and Exs. 1–4, 17, 106, 123–140.
R. R. Shaffer, U.S. Pat. No. 3,560,616, Feb. 2, 1971, Col. 3, Line 48 through Col. 7, Line 26 and Exs. 3–9, 11–18.
E. Somers, "Formulation ". Chapter 6 in Torgeson, "Fungicides", Vol. I, Academic Press, New York, 1967.

The following Examples further illustrate the formulation of compositions within the scope of this invention.

EXAMPLE 3

| Wettable Powder | Percent |
| --- | --- |
| Methyl 4-(3-amino-2-quinoxyalinyl)-3-thioallophanate | 40 |
| dioctyl sodium sulfosuccinate | 1.5 |
| sodium ligninsulfonate | 3 |
| low-viscosity methyl cellulose | 1.5 |
| attapulgite | 54 | the ingredients are thoroughly blended, passed through an air mill, to produce an average particle size under 15 microns, reblended, and sifted through a U.S.S. No. 50 sieve (0.3 mm opening) before packaging.

All compounds of the invention may be formulated in the same manner.

EXAMPLE 4

| Dust | Percent |
| --- | --- |
| wettable powder of Example 3 | 10 |
| pyrophyllite (powder) | 90 |

The wettable powder and pyrophyllite diluent are thoroughly blended and then packaged. The product is suitable for use as a dust.

EXAMPLE 5

| High-Strength Concentrate | Percent |
| --- | --- |
| 2-methoxyethyl 4-(3-amino-2-quinoxalinyl)-3-thioallophanate | 98.5 |
| silica aerogel | 0.5 |
| synthetic amorphous fine silica | 1.0 |

The ingredients are blended and ground in a hammer mill to produce a high-strength concentrate essentially all passing a U.S.S. No. 50 sieve (0.3 mm openings). This material may then be formulated in a variety of ways.

EXAMPLE 6

| Aqueous Suspension | Percent |
| --- | --- |
| methyl 4-[3-(3-methoxycarbonyl-2-thioureido)-2-quinoxalinyl]-3-thioallophanate | 25 |
| hydrated attapulgite | 3 |
| crude calcium ligninsulfonate | 10 |
| sodium dihydrogen phosphate | 0.5 |
| water | 61.5 |

The ingredients are ground together in a ball or roller mill until the solid particles have been reduced to diameters under 10 microns.

EXAMPLE 7

| Oil Suspension | Percent |
| --- | --- |
| S-methyl 4-{3-[3-(S-methylthio-carbonyl)-2-thioureido]-2-quinoxalinyl}-1,3-dithio-allophanate | 35 |
| blend of polyalcohol carboxylic esters and oil soluble petroleum sulfonates | 6 |
| xylene | 59 |

The ingredients are combined and ground together in a sand mill to produce particles mostly all below 3 microns. The product can be used directly, extended with oils, or emulsified in water.

We claim:
1. A compound of the formula

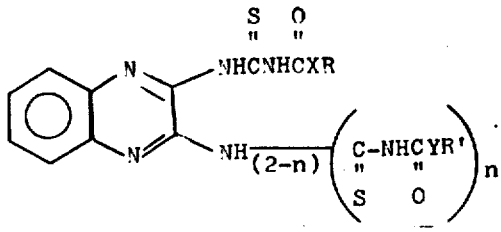

wherein
X is oxygen or sulfur;
Y is oxygen or sulfur;
$n$ is 0 or 1;
R is alkyl of 1 to 4 carbon atoms, allyl or methoxyethyl, and
R' is alkyl of 1 to 4 carbon atoms, allyl or methoxyethyl.
2. A compound of claim 1 wherein $n$ is 0.
3. The compound of claim 1 wherein $n$ is 0 and R is methy.

* * * * *